United States Patent Office 3,312,276
Patented Apr. 4, 1967

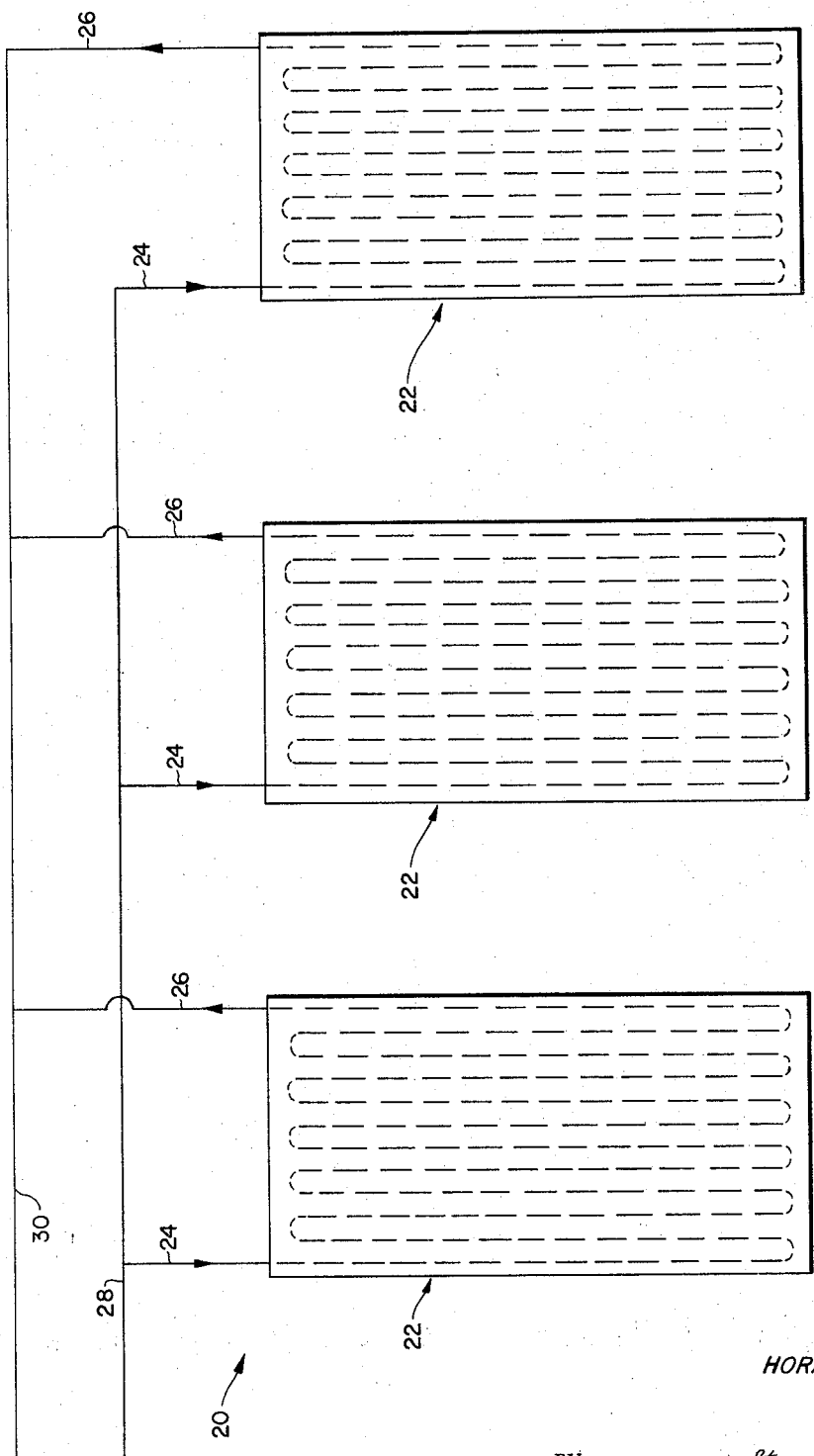

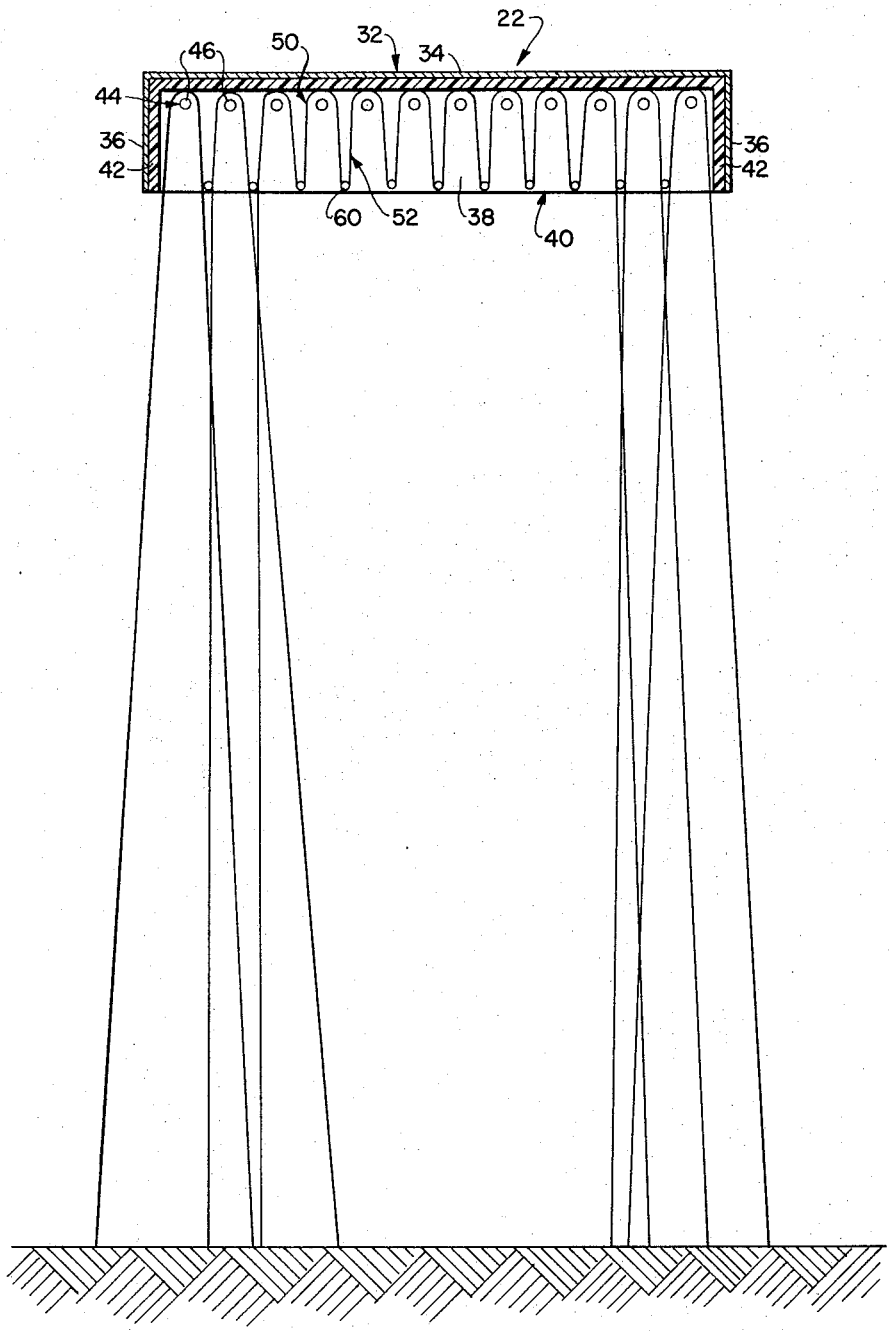

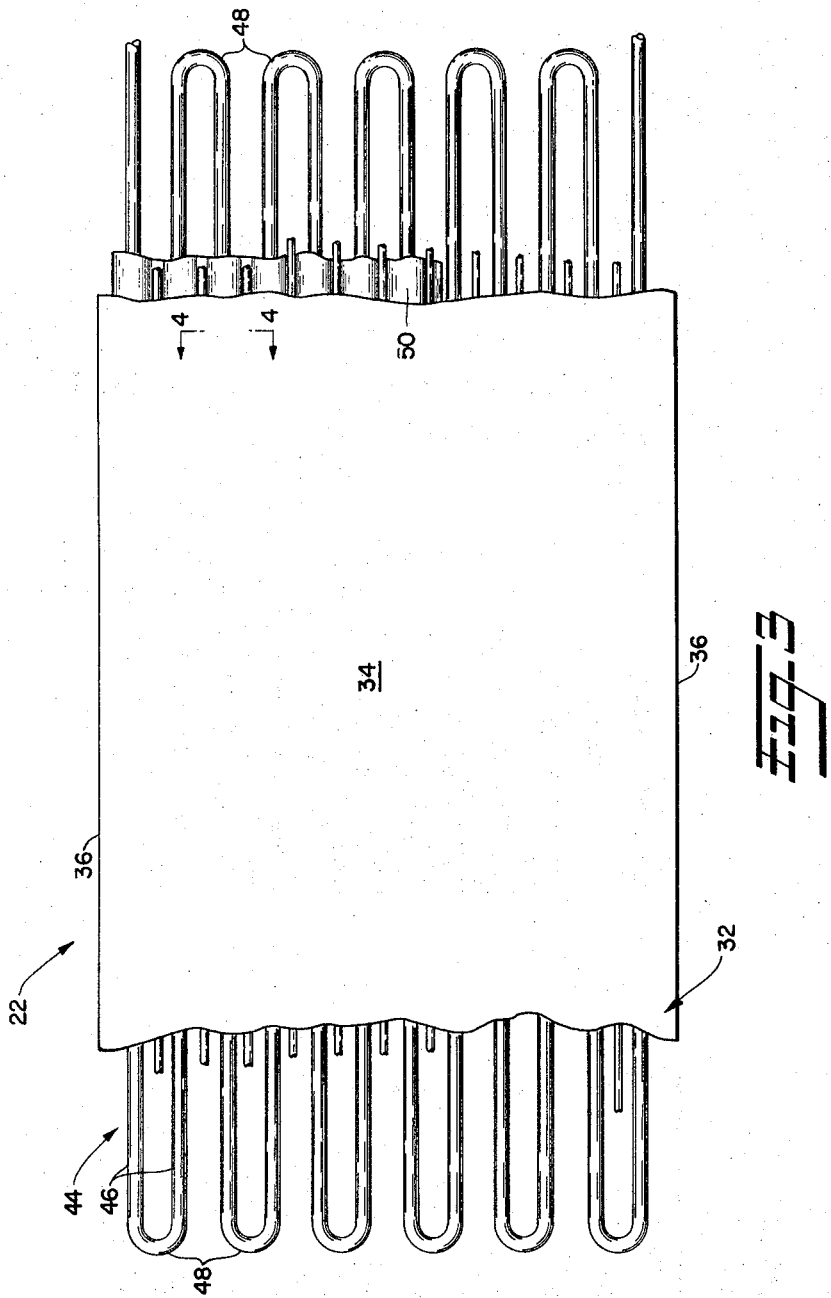

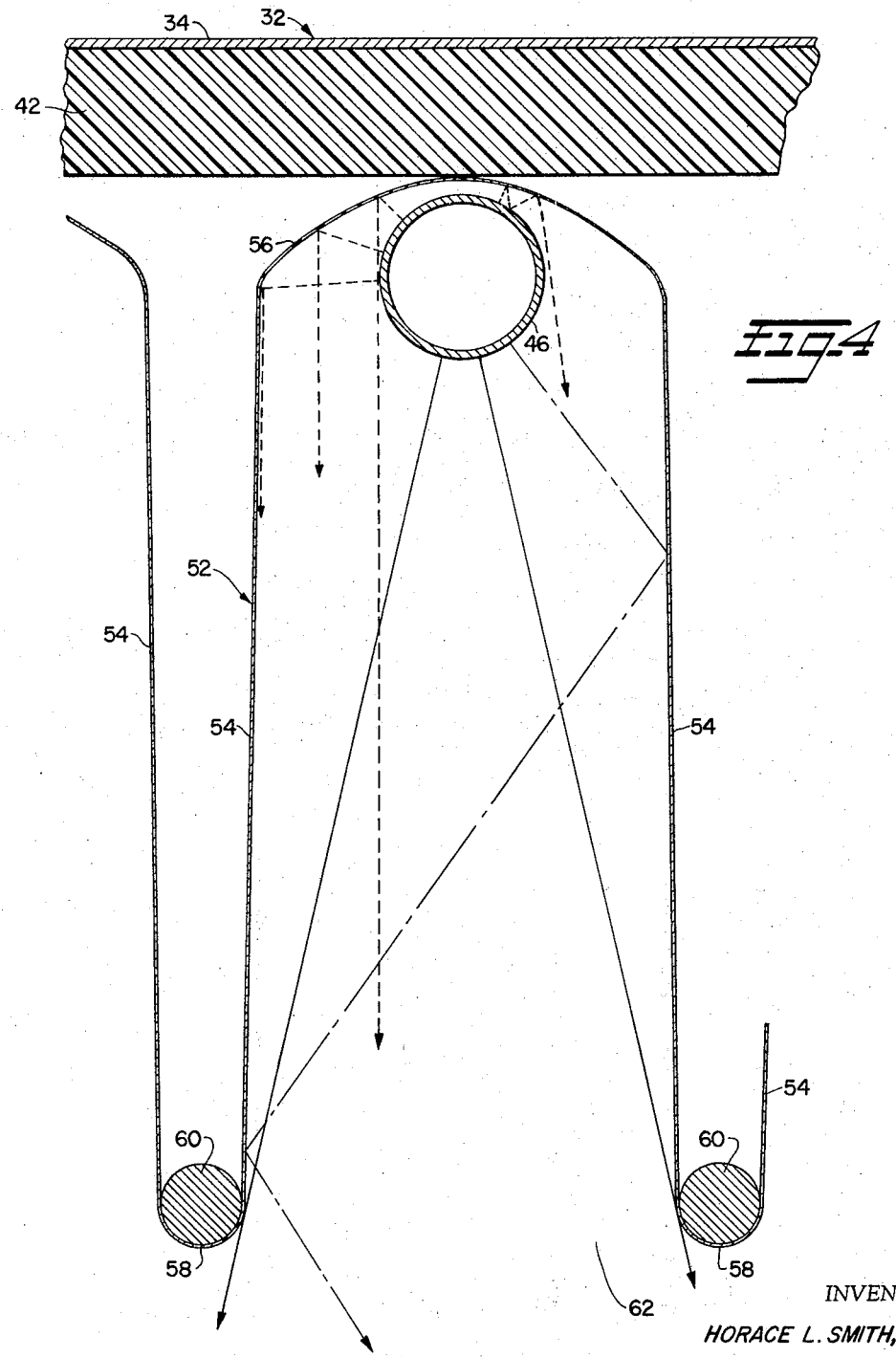

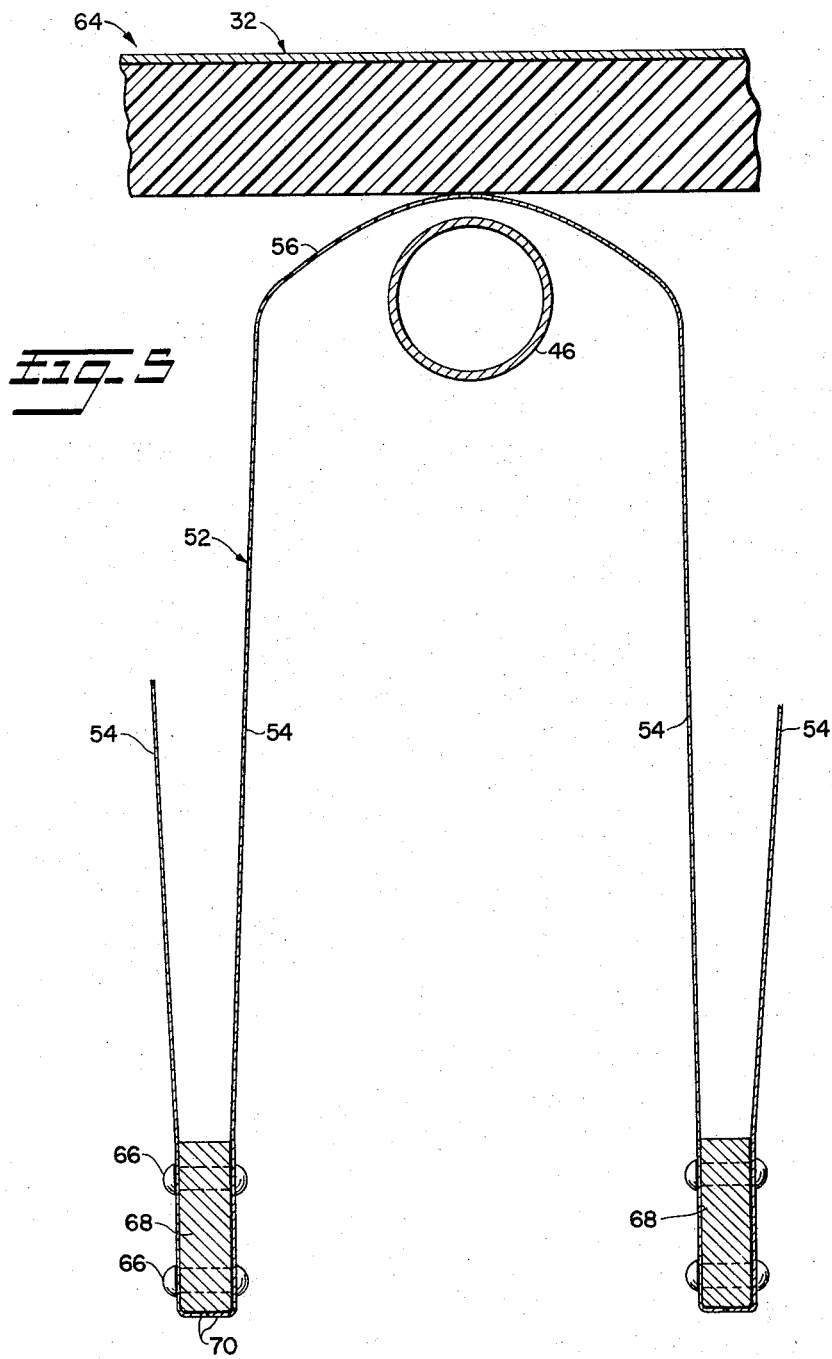

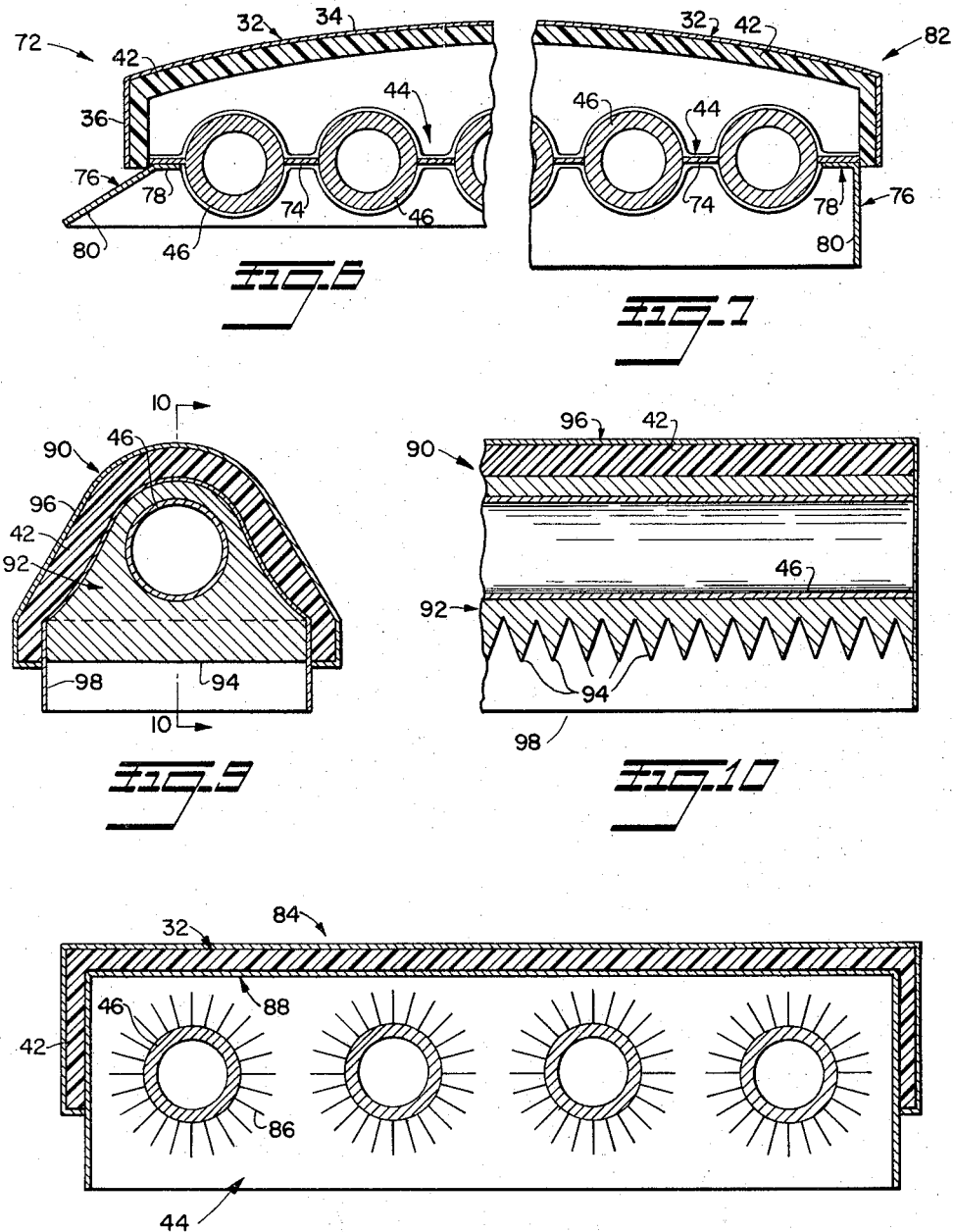

3,312,276
RADIANT HEATING APPARATUS
Horace L. Smith, Jr., Richmond, Va., assignor to Hupp Corporation, Cleveland, Ohio, a corporation of Virginia
Filed Oct. 28, 1965, Ser. No. 505,492
6 Claims. (Cl. 165—133)

This invention relates to heating and, more specifically, to radiant heating units.

The radiant heating units disclosed herein are specifically intended to be used as overhead heaters in buildings or out-of-doors. They may, however, be adapted to other heating applications; and the reference to overhead heating is therefore intended to be illustrative and not limiting.

Probably the most satisfactory and most widely used radiant type overhead heater in use at the present time is that disclosed in U.S. Patent No. 2,775,294, issued Dec. 25, 1956, to Gunther Schwank for Radiation Burners. Schwank heaters are of an unvented combustion type in which the energy liberated by the combustion of a fuel-air mixture heats a ceramic radiant to incandescence to provide the radiant heat energy. Combustion type infrared generators have a number of disadvantages when employed as overhead radiant heaters. For example, they are susceptible to being blown out when employed out-of-doors. When employed indoors, they must be carefully regulated to prevent the generation of carbon monoxide. Further, the radiant faces of Schwank type infrared generators operate at temperatures on the order of 1600° F. The radiant energy emitted from a surface at this temperature has too short a wave length to be particularly effective for the area heating overhead radiant heaters are used to provide. In addition, in drafty or out-of-door locations, air currents passing across the radiant surfaces cool them by convection, substantially reducing their heat output.

I have now discovered that these disadvantages may be avoided by utilizing for overhead radiant heating a novel radiant heating unit in which a heated fluid is circulated through a tubular radiator to heat the latter. By controlling the temperature of the heat transfer medium, the radiator can be maintained at a temperature at which it will emit radiant energy in the range of wave lengths most readily absorbed by the objects in or occupants of the area being heated. Consequently, this radiant heater is more effective for area heating than those of the combustion type. Moreover, there is no blow out problem and no danger of carbon monoxide accumulating. Moreover, by employing a novel reflector I have developed in these radiant heating units, the radiation emitting surfaces can be almost perfectly shielded from the effects of convection currents.

Various types of radiant heaters incorporating a radiator through which a fluid is circulated are well known. In comparison to most known radiant heaters of this type, however, those disclosed herein are more efficient, lighter and less expensive, less susceptible to convection currents, and have a higher heat output per unit area of projected radiation emitting surface. In addition, the novel reflectors referred to above permit the emitted radiant energy to be more effectively concentrated than has heretofore been possible.

From the foregoing, it will be apparent that one primary object of the present invention resides in the provision of novel, improved radiant heaters.

In conjunction with the foregoing object, other important objects of the present invention include the provision of radiant heaters which:

(1) Are particularly adapted to be utilized as overhead heaters for area heating;

(2) In conjunction with the preceding object, can be used indoors without danger of generating carbon monoxide and out-of-doors without danger of blow out;

(3) In conjunction with object (1), can be operated so as to emit radiant energy in the range of wave lengths most readily absorbed by the objects in or occupants of the area being heated;

(4) Are not susceptible to cooling of their radiation emitting surfaces and a consequent reduction in efficiency by convection currents;

(5) Utilize tubular radiators adapted to have a fluid heat transfer medium circulated therethrough and, in comparison to previously known radiant heaters of this type, are more efficient, lighter, and less expensive, and have a higher heat output per unit area of projected radiant energy emitting surface; and (6) Have novel reflectors which more effectively concentrate the emitted radiation for area heating than previously known reflectors.

Other objects, additional novel features, and further important advantages of the present invention will become more fully apparent from the appended claims and as the ensuing detailed description and discussion proceeds in conjunction with the accompanying drawing, in which:

FIGURE 1 is a diagrammatic illustration of a heating system employing radiant heating units constructed in accord with the principles of the present invention;

FIGURE 2 is a partially diagrammatic section through the radiant heating unit of FIGURE 1, depicting the manner in which it concentrates the radiation emitted therefrom into an area above which the heating unit is located;

FIGURE 3 is a plan view of the radiant heating unit with several of its components broken away to more clearly illustrate its construction;

FIGURE 4 is a section through the radiant heating unit; taken substantially along line 4—4 of FIGURE 3;

FIGURE 5 is a view similar to FIGURE 4, showing an alternate form of reflector construction;

FIGURE 6 is a section through a modified form of radiant heating unit constructed in accord with the principles of the present invention;

FIGURE 7 is a view similar to FIGURE 6 of a radiant heating unit of the type shown in the latter figure, but employing a modified reflector configuration;

FIGURE 8 is a section through still another form of radiant heating unit constructed in accord with the principles of the present invention;

FIGURE 9 is a section through a fifth form of radiant heating unit constructed in accord with the principles of the present invention; and FIGURE 10 is a section through the radiant heating unit of FIGURE 9, taken substantially along line 10—10 of the latter figure.

Referring now to the drawing, FIGURE 1 illustrates a radiant heating system 20 consisting of a plurality of radiant heating units 22 constructed in accord with the principles of the present invention, which are connected by branch supply and return lines 24 and 26 to main supply and return lines 28 and 30, respectively. The main supply and return lines are connected into a liquid heating and circulation system, preferably of the type disclosed in my copending application No. 237,817 filed Nov. 15, 1962, for High Temperature Heating System (now Patent No. 3,236,292). In one particular application of the principles of the present invention, the radiant heating units 22 are intended to be disposed overhead in buildings or out-of-doors to heat objects in and/or occupants of the area therebelow.

Referring now to FIGURES 2–4, each of the novel radiant heating units 22 includes a casing 32 having a top wall 34, side walls 36, end walls 38 (only one of which is shown), and an open bottom 40. The inner surfaces of walls 34, 36, and 38 are covered with a layer of insulation identified generally by reference character 42.

Supported in casing 32 in any suitable manner in a tubular radiator 44 which, as best shown in FIGURE 3, is a single elongated integral or fabricated tubular component of serpentine configuration. The radiator has parallel legs or runs 46 connected in series by return bends 48, which are alternately located at opposite ends of the radiator. Radiator 44 may be formed from any desired material, but light weight steel tubing is preferred.

The use of a single serpentine tube in radiator 44 represents an important advance over the conventional arrangement of radiating tubes connected in parallel between inlet and outlet headers. This is because the temperature drop through serpentine radiator 44 is about eight to ten times as great as in a radiator of the conventional type. Consequently, much more heat can be extracted from the circulating liquid by the type of radiator employed in the present invention; and, therefore, less liquid has to be circulated, reducing pumping and other costs. The serpentine arrangement would have a slightly lower surface temperature than the conventional arrangement and, consequently, a slightly lower heat output. However, the cost of increasing the radiant surface area would not significantly effect the savings realized in reduced pumping costs, etc.

Radiator 44 is preferably coated with a highly emissive material (one having an emissively coefficient of at least 0.95) to increase emission of radiant energy therefrom. Suitable coating materials for this purpose, described in detail in my Patent No. 3,157,476 issued Nov. 17, 1964, for Radiant Energy Heat Treating Improvements, include varnishes, lampblack, black oxide films, and glass frit enamels. Other coatings having high emissivity may be used instead, if desired.

Radiant heating units constructed in accord with the principles of the present invention will typically be from 2 to 4 feet wide and from 6 to 10 feet long. The tube from which radiator 44 is fabricated will typically have a 1.25 inch outside diameter with runs 46 spaced 3.75 inches, center-to-center. The distance between tube runs 46 is important in the practice of the present invention. By spacing runs 46 apart a distance approximately equal to their developed circumference, radiator 44 will emit radiant energy substantially as if it had a continuous, flat, radiant surface.

Radiator 44 is preferably heated by circulating through it one of the high boiling point hydrocarbon liquids or eutectic mixtures of inorganic salts described in my copending applications Nos. 323,848 filed Nov. 14, 1963, for Heat Exchangers (now Patent No. 3,262,494) and 447,017 filed Apr. 9, 1965, for Apparatus (now Patent No. 3,228,462). As discussed in these applications, such heat transfer liquids may be circulated at extremly high temperatures (500–700° F. and higher) in the liquid state so that system components need be designed to withstand only very low pressures (the system head). At temperatures of 700° F., radiator 44 will have a heat output of approximately 2200–3200 B.t.u.'s per hour per square foot of projected radiating surface area. Therefore, a 4 foot by 8 foot radiator at a temperature of 700° F. will have an output of approximately 100,000 B.t.u.'s per hour, which is much higher than the output from a steam or hot water radiator of equal size.

Referring now to FIGURES 2 and 4, one of the novel and most important features of the present invention is a reflector 50 mounted in any desired manner in casing 32 to concentrate and direct into the area being heated the radiant energy emitted from radiator 44. As best shown in FIGURE 4, reflector 50 consists of generally parabolic reflecting units 52 surrounding the tube legs 46 of radiator 44. Each reflecting unit 52 has two legs 54 connected by a generally arcuate web 56. Adjacent legs 54 of successive reflecting units 52 are integrally connected by a semicircular connecting portion 58, as shown in FIGURE 4. Stiffening rods 60 are disposed between the adjacent reflecting unit legs abutting connecting portions 58 to add structural rigidity to the reflector. Rod 60 may be fastened in place by spot welding or by bolts or other fasteners. Reflector 50 is preferably, though not necessarily, fabricated of highly polished light gauge sheet aluminum.

As shown in FIGURE 4, radiator 44 is so mounted relative to reflector 50 that tube runs 46 are slightly spaced from the closed ends 56 of reflecting units 52. This is an important arrangement since, by providing a space between the tube runs and the closed end of the reflectors, substantially all of the radiant energy emitted from the upwardly facing surfaces of radiator 44 will be reflected from legs 54 and closed ends 56 of reflector units 52 through open bottom 62 of the reflector into the area being heated.

Referring now to both FIGURES 2 and 4, a further important feature of the specific reflector configuration disclosed herein is that substantially all of the energy emitted from radiator 44 will be concentrated by reflector 50 and projected in a beam through the area directly below the radiant heating unit. The beams emanating from successive reflecting units 52 overlap to provide a substantially uniform concentration of energy below the radiant heating unit.

Another important advantage of the reflector configuration illustrated in FIGURE 4 is that there is virtually no loss of energy from radiator 44 due to cooling of its emitting surfaces by convection currents. In operation, hot air is trapped in the reflector units because it is lighter than the cooled air surrounding the radiant heating unit and therefore tends to rise toward the closed ends of the reflecting units. The hot air in the reflecting units acts as an insulating barrier between tube runs 46 and convection currents. This advantage obtains not only where the radiant heating unit is absolutely level but where it is tilted about an axis extending normal to the plane of the paper as shown in FIGURE 2.

A number of advantages of the novel radiant heating unit just described above have been mentioned above. Among the additional advantages of this unit are light weight and low cost. In addition, operating costs are low; and the unit is sufficiently versatile that it can be connected into numerous piping arrangements.

Referring again to the drawing, FIGURE 5 shows a radiant heating unit 64 which, in most respects, is similar to the radiant heating unit 22 just described. Like reference characters have, therefore, been employed to identify the components which are the same in both embodiments of the present invention.

Radiant heating unit 64 differs from unit 22 in that the reflecting units 52 of radiator 50 are formed as independent units rather than integrally as in the embodiment of FIGURES 2–4. The apposite legs 54 of adjacent reflecting units 52 are joined to connect the several reflecting units into a unitary structure by fastening them as with rivets 66 to a rectangularly sectioned stiffening member 68 which fits between the legs and abuts flanges 70 formed at the bottoms of the legs. Depending upon the fabricating equipment available, this construction may be easier and less expensive to manufacture than that heretofore described.

FIGURES 6–10 of the drawing illustrate further modifications of the present invention in which, again, the same reference characters as were heretofore used have been employed to identify components which are the same as those previously described.

Referring now specifically to FIGURE 6, the radiant heating unit 72 illustrated in this figure differs from those previously described primarily in the construction of radiator 44 and in the type of reflector employed. In the radiator 44 illustrated in FIGURE 6, rectangularly sectioned webs 74 of heat conductive material are fixed to and extend between adjacent tube runs 46 of the radiator.

As discussed in detail in my copending application No. 323,848, filed Nov. 14, 1963 for Heat Exchangers (now Patent No. 3,262,494), such conductive webs increase the radiant surface of the radiator and, in addition, bring about a substantially uniform emission of radiant energy across the radiant surface. This is because the net effect of the tube runs and conductive webs is to maintain the entire radiant surface of the radiator at a uniform temperature. In this embodiment of the present invention, both the tube legs 46 and conductive webs 74 are coated with a highly emissive material of the type described previously.

Radiant heating unit 72 utilizes reflectors 76 having angularly disposed mounting and reflecting legs 78 and 80, respectively. Mounting legs 78 are fixed to the outermost conductive webs 74 adjacent the side walls 36 of heater unit casing 32 with reflecting legs 80 extending downwardly and away from radiator 44. This arrangement provides a more diffused beam of radiant energy than the embodiments of the invention previously described. Such diffusion of the energy emitted from radiator 44 may be desirable for applications of the present invention where increased coverage and low flux densities are preferable or necessary.

The radiant heating unit 82 illustrated in FIGURE 7 differs from the heating unit of FIGURE 6 only in the configuration of reflectors 76. In heating unit 82, the mounting and reflecting legs 78 and 80 of the reflectors are at right angles so that the reflecting legs 80 extend vertically downward from radiator 44. This arrangement provides a more concentrated beam of emitted radiation similar to that produced by the embodiments of the present invention illustrated in FIGURE 2-4 and 5 although the radiators illustrated in FIGURE 7 will not as effectively concentrate the emitted energy as the reflector 50 of the earlier described embodiments.

In the radiant heating unit 84 illustrated in FIGURE 8, fins 86 of heat conductive material are fixed to each of the tube runs 46 of radiator 44. Fins 86, which are equidistantly spaced around the periphery of each tube run, are oriented normal to the associated tube run and extend substantially the length thereof. Fins 86 increase the emitting surface and, therefore, the efficiency of the radiator, although they increase its cost substantially. Tube runs of this construction will normally be employed where maximum efficiency takes precedence over the cost of the radiator.

In heating unit 84, reflector 88 is configured to match the inside of casing 32 and surrounds the sides and top of radiator 44. This arrangement reflects substantially all of the radiation emitted from the upper surfaces of radiator 44 back to the radiator to increase its temperature or through the open bottom side of casing 32 into the area being heated.

In this embodiment of the present invention, the surfaces of tube runs 46 and fins 86 are preferably coated with a highly emissive material as described previously.

High efficiencies may also be obtained by employing the radiant heating unit 90 illustrated in FIGURES 9 and 10 in applications where maximum efficiency is more important than cost. In radiant heating unit 90, a single tube run 46 is employed. This is surrounded by a casting 92 of heat conductive material having a generally trapezoidal configuration. Transversely extending saw tooth serrations 94 are formed in the lower portion of casting 92. Serrations 94 act as a black body radiator, regardless of their color or degree of surface polish, so that their presence materially enhances the radiation emitting efficiency of unit 90.

The casing 96 and reflector 98 of radiant heating unit 90 are similar to those employed in the embodiments of the invention previously described except that they differ in configuration. As in the embodiments described previously, the radiation emitting surface (the surfaces of serrations 94) can be coated with a highly emissive substance to further increase the efficiency of the radiant heating unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The combination of:
   a. a radiant heating unit comprising:
      (1) a casing having an open side;
      (2) a tubular radiator in and having parallel, spaced apart legs extending generally the length of said casing and tubular end bends disposed alternately at opposite ends of said casing providing fluid communication between successive radiator legs, whereby there is a continuous flow path through said radiator, said radiator being fabricated of a generally rigid, self-supporting, structural material;
      (3) a reflector in said casing, said reflector having, in surrounding relationship to each of said tubular radiator legs and extending substantially the length thereof, an independent reflecting portion with a generally parabolic cross-section for concentrating and directing the radiant energy emitted by the associated radiator leg which includes first and second leg portions and a web portion connecting said leg portions, each said tubular radiator leg being closely adjacent the connecting web portion of the reflector portion in which it is housed and the length of said reflector portion legs being a multiple of the diameter of the tubular leg and of the width of said web portion and thereby extending well beyond said radiator leg to shield said leg from convection currents and the cooling effects of such currents;
      (4) reflector portions integral with and joining the adjacent legs of each pair of adjacent reflecting portions at the ends of the legs adjacent the open side of said casing; and
      (5) individual stiffening members extending generally the length of said reflector fixed to and between each pair of adjacent reflecting portion legs in juxtaposition to the connecting portion therebetween to increase the structural rigidity of said reflector; and
   b. means for circulating a liquid heated to a temperature of not lower than about 500° F. through said radiator to thereby heat said radiator to a temperature at which it will emit radiant energy in the infrared portion of the spectrum.

2. The radiant heating unit of claim 1, together with a layer of insulation between said casing and said reflector.

3. The radiant heating unit of claim 1, together with a coating of a material having an emissivity of at least 0.95 on said tubular radiator legs.

4. The combination of:
   a. a radiant heating unit comprising:
      (1) a casing having an open side;
      (2) a tubular radiator in and having parallel spaced apart legs extending generally the length of said casing and tubular end bends disposed alternately at opposite ends of said casing providing fluid communication between successive radiator legs, whereby there is a continuous flow path through said radiator, said radiator being fabricated of a generally rigid, self-supporting, structural material;

(3) a reflector in said casing, said reflector having, in surrounding relationship to each of said tubular radiator legs and extending substantially the length thereof, an independent reflecting portion with a generally parabolic cross-section for concentrating and directing the radiant energy emitted by the associated radiator leg which includes first and second leg portions and a web portion connecting said leg portions, each said tubular radiator leg being closely adjacent the connecting web portion of the reflector portion in which it is housed and the length of said reflector portion legs being a multiple of the diameter of the tubular leg and of the width of said web portion and thereby extending well beyond said radiator leg to shield said leg from convection currents and the cooling effects of such currents; and (4) individual stiffening members extending generally the length of said reflector between each pair of reflecting portions, said stiffening members being separate from said reflector portions and the legs of the two reflecting portions between which each said stiffening member is located being connected thereto, whereby said stiffening members connect said individual reflecting portions into an integrated structure and increase the structural rigidity of said structure; and b. means for circulating a liquid heated to a temperature of not lower than about 500° F. through said radiator to thereby heat said radiator to a temperature at which it will emit radiant energy in the infrared portion of the spectrum.

5. The radiant heating unit of claim 4, together with a layer of insulation between said casing and said reflector.

6. The radiant heating unit of claim 4, together with a coating of a material having an emissivity of at least 0.95 on said tubular radiator legs.

References Cited by the Examiner

UNITED STATES PATENTS

| 1,324,008 | 12/1902 | D'Humy | 240—1.1 |
| 2,262,157 | 11/1941 | Beals | 240—78 |
| 2,337,437 | 12/1943 | Allen | 240—51.11 |
| 2,946,510 | 7/1960 | Galvin | 237—70 |
| 3,008,692 | 11/1961 | Gerard | 237—70 |
| 3,039,453 | 6/1962 | Andrassy | 165—133 X |

FOREIGN PATENTS

| 817,136 | 5/1937 | France. |
| 58,972 | 12/1953 | France. |
| 1,086,133 | 8/1954 | France. |
| 264,004 | 1/1937 | Great Britain. |
| 395,008 | 7/1933 | Great Britain. |

EDWARD J. MICHAEL, *Primary Examiner.*